United States Patent
Singh et al.

(10) Patent No.: US 10,558,946 B2
(45) Date of Patent: Feb. 11, 2020

(54) ITEM REPLENISHMENT

(71) Applicant: ACCENTURE GLOBAL SOLUTIONS LIMITED, Dublin (IE)

(72) Inventors: Paul Sundar Singh, Chennai (IN); Siva Kumar Raja Ramanathan, Chennai (IN); Deepa Rajendran, Karur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 357 days.

(21) Appl. No.: 15/600,390

(22) Filed: May 19, 2017

(65) Prior Publication Data

US 2018/0260779 A1 Sep. 13, 2018

(30) Foreign Application Priority Data

Mar. 13, 2017 (IN) .............................. 201741008657

(51) Int. Cl.
*G06Q 10/08* (2012.01)
*G06Q 10/06* (2012.01)
*G06Q 30/02* (2012.01)

(52) U.S. Cl.
CPC ... *G06Q 10/0875* (2013.01); *G06Q 10/06395* (2013.01); *G06Q 30/0282* (2013.01)

(58) Field of Classification Search
CPC ......... G06Q 10/0875; G06Q 10/06395; G06Q 30/0282
See application file for complete search history.

(56) References Cited

U.S. PATENT DOCUMENTS

| | | | | |
|---|---|---|---|---|
| 10,332,066 | B1* | 6/2019 | Palaniappan | G01G 19/52 |
| 2003/0216969 | A1* | 11/2003 | Bauer | G06K 7/0008 705/22 |
| 2013/0159144 | A1* | 6/2013 | Higgins | G06Q 30/0601 705/26.81 |
| 2014/0310048 | A1* | 10/2014 | Murray | G06Q 10/087 705/7.22 |
| 2018/0204199 | A1* | 7/2018 | Mohiuddin | G06Q 20/203 |

FOREIGN PATENT DOCUMENTS

WO WO-2016181352 A1 * 11/2016 ........... G06Q 10/087

* cited by examiner

*Primary Examiner* — A. Hunter Wilder
*Assistant Examiner* — Joseph M Mutschler
(74) *Attorney, Agent, or Firm* — Mannava & Kang, P.C.

(57) ABSTRACT

According to an example of the present disclosure, a system is disclosed. The system comprises at least one sensing unit and a robotics engine in communication with the at least one sensing unit. The at least one sensing unit detects stock information associated with an item. The robotics engine performs a trend analysis based on the stock information collected over a predefined duration of time, and determines a threshold value based on the trend analysis. Furthermore, the robotics engine generates an alert when the stock information is below the threshold value, and selects a vendor based on one or more predefined parameters. The robotics engine also generates an instruction to obtain the replacement item from the selected vendor for replenishing the item in an inventory.

15 Claims, 6 Drawing Sheets

ITEM REPLENISHMENT

CROSS-REFERENCE TO RELATED APPLICATIONS

This application claims priority from Indian Provisional Patent Application bearing Application Number 201741008657 filed on Mar. 13, 2017, the disclosure of which is incorporated by reference.

BACKGROUND

Items such as for example, spare parts for products of a business, are typically stored in a warehouse or a storage location. These are the places where the business maintains stocks of the items so that it can ensure accurate and timely delivery of the items as and when needed. In this day and age when customer service and satisfaction have become important for a business to stand apart from its competition, there is a growing need for effective item management. Furthermore, efficient management of items is a common goal of manufacturers as the availability of items has a direct impact on revenue and profit.

Typically, item management operations, such as, for example, determining stock levels of items in the inventory, ascertaining items to be replenished, order placing, and clearing duties for purchased items are performed by individuals. Such an approach to items management, however, involves a lot of challenges. For instance, a real-time estimate of item stock in the warehouse may not be available. Furthermore, manual intervention and dependence on individuals may become necessary for item management. Moreover, in large warehouses, efficient item management may be difficult to achieve by solely relying on individuals and the information in their possession.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes a system, a system for automatically replenishing items in an inventory. According to an example of the present disclosure, the system detects stock information associated with an item stored in a storage unit. The stock information may be indicative of at least one of a height, a weight, and a quantity of the item. The storage unit refers to an apparatus for holding one or more items. Based on a type of item to be stored, a suitable storage unit may be selected for storing the item. Examples of the storage unit may include, but are not limited to, bins, shelves, containers, racks, and pallets.

In an embodiment, the system may implement machine learning techniques and data mining techniques for performing trend analysis based on the stock information collected over a predefined time duration. The trend analysis allows for estimating consumption of the item during different time periods such as, for example, during peak season and off-season. Based on the trend analysis, the system may determine a threshold value for a quantity of the item. Specifically, the threshold level of the quantity of the item may be set to different values during different times, for example during different times of the year depending on the consumption trend detected for the item through the year. For example, if an item is consumed more frequently during the summer months, its threshold level may be set to a higher level than a corresponding threshold level for use during the winter months when the item is consumed less frequently.

In an example, when the system determines the quantity of the item in the storage unit to be equal to or lower than the threshold value, the system automatically places an order with a vendor of the item based on predefined parameters, such as vendor delivery time, vendor quality, parts defect rates, warranty information, and the like.

In an embodiment, the system comprises properly calibrated multi-dimension sensors or sensing units for detecting the stock information. Thus, information collected through such sensors improves the accuracy of data gathered. Additionally, the system may use information gathered from these multidimensional sensors to perform the trend analyses as discussed above. In addition, the trend analysis when performed by using machine learning and data mining techniques along with associated rules may result in an automated end to end solution for item management. Thus, the system in accordance with the present disclosure may facilitate timely automated ordering of items. As a result, an acceptable quantity of items may be maintained at all times thus reducing the probability of an item being unavailable when needed.

Figure 1:
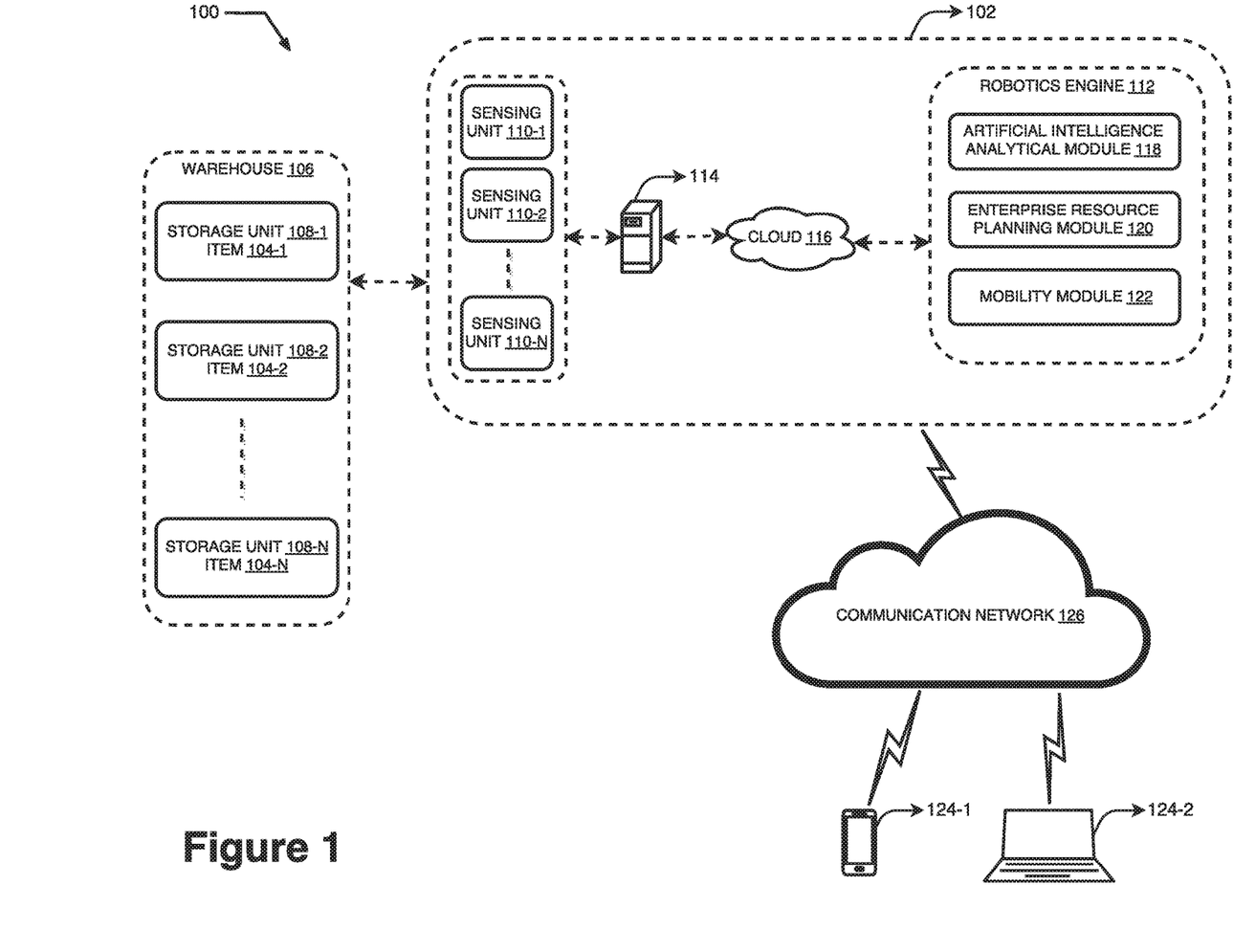
FIG. 1 illustrates a schematic view of an environment implementing a system for replenishing items in a warehouse, according to an example of the present disclosure.

FIG. 1 illustrates a schematic view of an environment 100 implementing a system 102 for replenishing a plurality of items 104 in a warehouse 106, according to an example of the present disclosure. The plurality of items 104 are individually referred to as an item 104-1, an item 104-2, . . . and an item 104-n. Each item 104 may be allocated with a unique identification number in order to differentiate an item, for example, the item 104-1, from another item, for example, the item 104-2. In an example embodiment, the warehouse 106 may house a plurality of storage units 108 for carrying the items 104. The storage units 108 may individually be referred to as a storage unit 108-1, a storage unit 108-2, ... and a storage unit **108-*n*. Each of the storage units 108 may be allocated with a unique identification number which would assist in differentiating a storage unit, for example, the storage unit 108-1, from another storage unit, for example, the storage unit 108-2**.

Furthermore, in an example embodiment, the items 104 may include items with varying dimensions and characteristics. For example, the item 104-1 may comprise a first set of dimensions with respect to parameters such as height, length, and width, and the item 104-2 may comprise a second set of dimensions, where one or more of the second set of dimensions differ from one or more of the first set of dimensions. The system 102 may be used to replenish the items 104 in the storage units 108 of the warehouse 106.

The system 102 may include at least one sensing unit 110 and a robotics engine 112 in communication with the sensing unit 110. The sensing unit 110 may be disposed so as to detect stock information associated with the items 104, e.g., associated with each of items 104 stored in the storage units 108. The stock information of an item, for example, the item 104-1, may be indicative of at least one of a height value of the item 104-1, a width value of the item 104-1, a length value of the item 104-1, a weight value of the item 104-1, and a quantity of the item 104-1. Therefore, the sensing unit 110 may include at least one of a dimension sensing unit, a depth sensing unit, a weight sensing unit, and a beacon. The dimension sensing unit may include, but is not limited to, a height sensing unit, a length sensing unit, and a width sensing unit.

In an example embodiment, the sensing unit 110 may be calibrated to detect the stock information of the items 104. For example, the sensing unit 110 may be calibrated, based on dimensions, arrangement, and behavior of the items 104 due to environmental factors. The environmental factors may include, but are not limited to, a temperature value, a humidity value, and a pressure value maintained in the warehouse 106. In some cases, an item 104 may change characteristic behavior based on the environmental factors. For example, the items 104, such as rubber, seal, and oil may change their shape or properties depending on the temperature value and the pressure value of the surroundings. Similarly, an item 104 having water as an ingredient may freeze if the item 104 is stocked in a low temperature region. In fact, in some cases, non-toxic substances may turn toxic in certain environmental factors. The calibration of the sensing unit 110 is explained in detail in the description of FIG. 6.

The stock information of the items 104 as detected by the sensing unit 110 may then be forwarded to the robotics engine 112. In an example embodiment, the environment 100 may include a web services server 114, for enabling the transmission of the stock information between the sensing unit 110 and the robotics engine 112. The web services server 114 may receive the stock information from the sensing unit 110 and may subsequently forward the stock information to the robotics engine 112.

In an example embodiment, the environment 100 may include a cloud network 116 for receiving the stock information from the web services server 114. The stock information may then be stored in the cloud network 116 for further processing. In an example embodiment, the web services server 114 may transmit the stock information to the cloud network 116 in an online mode as well offline mode. In an embodiment, the robotics engine 112 may retrieve the stock information from the cloud network 116. In an example embodiment, when the cloud network 116 is in the offline mode, the stock information received from the sensing unit 110 may be stored in the web services server 114 before being forwarded to the robotics engine 112. On the other hand, when the cloud network 116 resumes operation, i.e., in the online mode, the stock information may again be stored in the cloud network 116 before being forwarded to the robotics engine 112.

Upon receiving the stock information of the items 104, the robotics engine 112 may compare the stock information with a threshold value for the stock information of the items 104. Based on the comparison, the robotics engine 112 may generate an instruction to order items 104 from one or more vendors to replenish the storage units 108. The operational characteristics of the robotics engine 112 are explained in detail with regard to various components of the robotics engine 112 in the subsequent sections of the description.

In an example embodiment, the robotics engine 112 may include an Artificial Intelligence Analytical (AIA) module 118, an Enterprise Resource Planning (ERP) module 120, and a mobility module 122. The AIA module 118 may collect the stock information of the items 104 received from the sensing unit 110. For example, AIA module 118 may receive information over a predefined time interval, such as a production shift, day, week, etc. In one example embodiment, the AIA module 118 may allocate the unique identification number to each of the storage units 108 in the warehouse 106. Based on the positioning of the items 104 on the storage units 108, the AIA module 118 may map the unique identification numbers of the items 104 with the unique identification numbers of the storage units 108. Therefore, the AIA module 118 may maintain a record of the items 104 being positioned in the storage units 108.

Based on the stock information of the items 104 received over the predefined duration of time and the mapping of the unique identification numbers of the items 104 against the unique identification numbers of the storage units 108, the AIA module 118 may perform a trend analysis of the items 104 residing in a storage unit 108. The trend analysis may be indicative of a variation in the quantity of the items 104 over the predefined duration of time. In an example embodiment, the AIA module 118 may perform the trend analysis based on peak-time sale records and off-peak-time sale records of the items 104.

Based on the trend analysis, the AIA module 118 may estimate a consumption of the items 104 for a time interval in the future. For example, based on historical records for consumption of the items 104, the AIA module 118 may estimate the consumption of the items 104 in the future. Furthermore, based on the trend analysis and the estimation of the consumption, the AIA module 118 may determine an appropriate threshold value for the quantity of each of the items 104. In an example embodiment, a threshold value for the quantity of the items 104 for a peak season may be different than a threshold value for the quantity of the items 104 for an off-peak season for a product making use of one or more of the items 104.

Continuing with the determination of the threshold value, the AIA module 118 may compare the stock information with the threshold value. Based on the comparison between the stock information and the threshold value, the AIA module 118 may generate an alert. In an example embodiment, the alert may be indicative of the quantity of the item 104 being below the threshold value.

In an example embodiment, in response to the alert, the AIA module 118 may select the vendor of the item 104 based on one or more predefined parameters. The predefined parameters may include at least one of a quality of a replacement item 104 provided by the vendor, a cost of the replacement item 104 set by the vendor, a time of delivery associated with the replacement item 104 as claimed by the vendor, a defect rate of a procured item 104 purchased prior to the replacement item 104 received from the vendor, an item output, and historical records of the vendor. The replacement item 104 may be understood as an item, such as the item 104, which is purchased to replenish an inventory including the item 104, for example, when a quantity of the item 104 goes below the threshold level. The procured item 104 may be understood as an item, such as the item 104, procured or purchased in the past, prior to the replacement item 104, from the vendor.

In an example embodiment, the AIA module 118 may be a Cognitive Robotic Process Automation (CRPA) tool that uses rules and data mining techniques of the Apriori algorithm to select the vendor. For example, the rules and data mining techniques of the Apriori algorithm analyze the relationships and cause and effects of the various predefined parameters to derive a Boolean value for vendor selection.

In continuation to the generation of the alert and the selection of the vendor by the AIA module 118, the ERP module 120 may generate an instruction for obtaining the replacement item 104 from the selected vendor for replenishing the item 104 in the inventory. In an example embodiment, before forwarding the instruction to the vendor, the ERP module 120 may forward the instruction to the mobility module 122. The mobility module 122 may further forward the instruction to an administrator who may be authorized to approve the instruction before sharing the instruction with the vendor. In an example embodiment, mobility module 122 allows for the remove monitoring of a warehouse via a dashboard view on communication device 124. In other words, mobility module 122 allows for the interaction between an administrator and system 100.

In an example embodiment, the system 102 may provide the administrator with log-in credentials to access a dashboard for interacting with the system 102. The log-in credentials may include, but are not limited to, a user name, a password, and security questions. In an example embodiment, the mobility module 122 may forward the instruction to the administrator through the dashboard, which may be accessed through at least one communication device 124 of the environment 100. The communication device 124 may include, but is not limited to, a smart phone, a desktop, a tablet, and a laptop. In one embodiment, the system 102 may be in communication with the communication device 124 through a communication network 126.

In an example embodiment, the administrator may access the dashboard through an application installed in the communication device 124. Before sharing the instruction with the vendor, the administrator may receive a notification on the communication device 124 for approving the instruction. Based on a response of the administrator to the notification, the ERP module 120 may forward the instruction to the vendor.

In an example embodiment, the ERP module 120 may determine whether the replacement items 104 have arrived from the vendor. The ERP module 120 may identify that the replacement items 104 were received based on the stock information of the items 104 received from the sensing unit 110. Furthermore, the ERP module 120 may update the threshold value of the items 104 once the replacement items 104 are obtained from the vendor.

In an example embodiment, the ERP module 120 may be associated with a database (not shown) storing various details pertaining to the system 102. The database may include, but is not limited to, item master data, storage unit master data, mapping data, vendor metrics data, and instruction creation data. The item master data, the storage unit master data, the mapping data, the vendor metrics data, and the instruction creation data may collectively be referred to as ERP data. In an example embodiment, the item master data may be indicative of details pertaining to the items 104 available in the warehouse 106, for example, the unique identification numbers of the items 104. Furthermore, the storage unit master data may be indicative of details pertaining to the storage units 108, for example, the unique identification numbers and environmental characteristics of the location of the storage units 108 in the warehouse 106. The mapping data may be indicative of the mapping of the items 104 against the unique identification numbers of the storage units 108 and therefore, reflect positioning of the items 104 in the storage units 108.

The vendor metrics data may be indicative of data pertaining to selection of the vendor for obtaining the items 104. For example, the vendor metrics data may include the predefined parameters used for selection of the vendor. Furthermore, the instruction creation data may be indicative of details pertaining to creation of instructions for obtaining the items 104 from the vendor. In an example embodiment, the database may be periodically synchronized with the cloud network 116 by sharing the data stored in the database with the cloud network 116. Additionally, the AIA module 118 may retrieve the data from the cloud network 116 for performing the trend analysis, generating the alert, selecting the vendor, and initiating the creation of the instruction by the ERP module 120.

In an example embodiment, the administrator may access details pertaining to the system 102 through the dashboard displayed on a display screen of the communication device 124. Therefore, the administrator may remotely monitor the functioning of the system 102 through the communication device 124.

As described above, the sensing unit(s) 110 monitors the item 104 and provides stock information related to the item 104, for example, in real-time. As a result, inventory detection and management may be performed, by the system 102, in real-time. For instance, the quantity of the item 104 may be detected in real-time and as soon as the quantity goes below the threshold level, an order for the replacement item 104 may be placed. Additionally, real time trend analysis performed by the system 102 facilitates in determining pertinent threshold levels for the item 104. Such real-time inventory detection and management, and trend analysis may prove beneficial, for example, in case of a fast moving or fast selling item. As the quantity of the fast selling item is tracked in real time, order for replenishing the fast selling item may be placed timely to ensure adequate stock of the fast selling item is available at all times in the inventory. In addition to the real-time trend analysis, and inventory detection and management, the system 102 is scalable and adaptive. For instance, information related to new items added to the inventory may be updated in the system 102. Subsequently, the algorithms and techniques implemented by the system 102 facilitates in determining the threshold for the new items.

Figure 2:
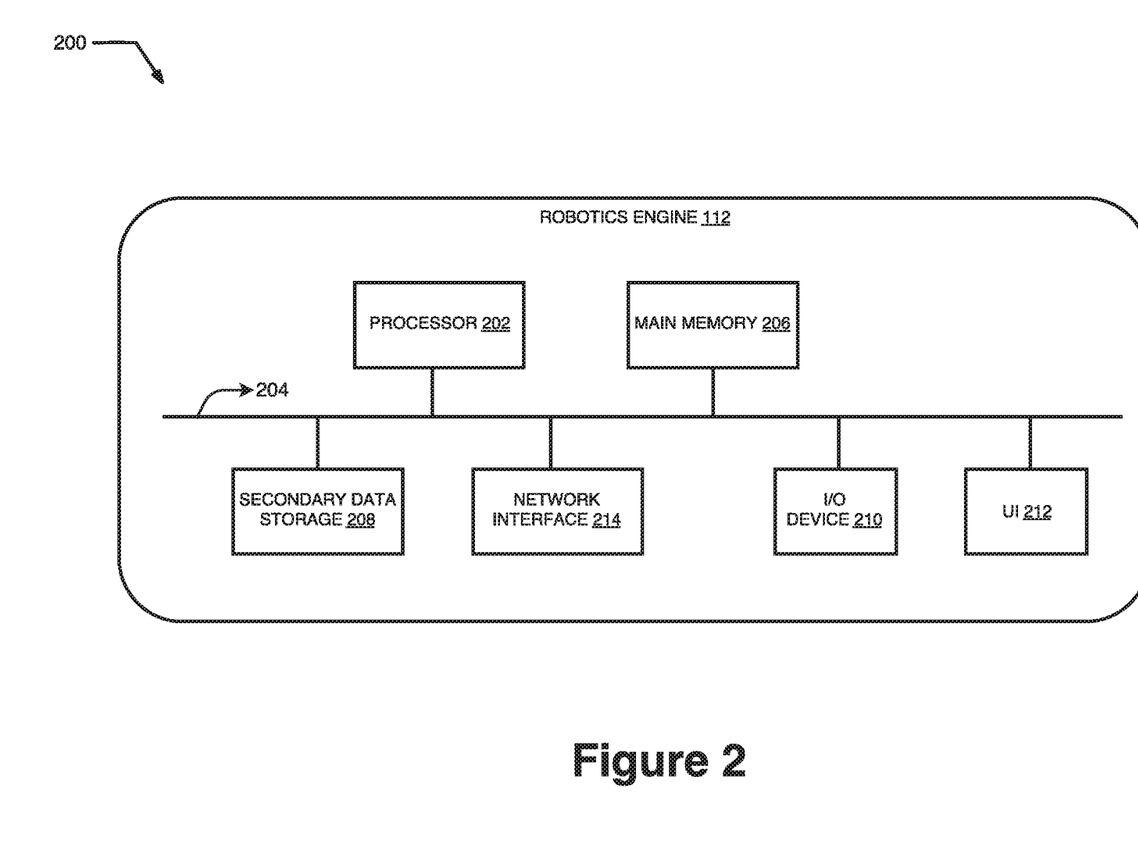
FIG. 2 illustrates a hardware platform for implementation of the system, according to an example of the present disclosure.

FIG. 2 illustrates a hardware platform 200 for implementation of the system 102, according to an example of the present disclosure. In an example embodiment, the hardware platform 200 may be a computer system 200 that may be used with the examples described herein. The computer system 200 may represent a computational platform that includes components that may be in a server or another computer system. The computer system 200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 200 may include a processor 202 that may implement or execute machine readable instructions performing some or all of the methods, functions, techniques and/or other processes described herein. Commands and data from the processor 202 may be communicated over a communication bus 204. The computer system 200 may also include a main memory 206, such as a random access memory (RAM), where the machine readable instructions and data for the processor 202 may reside during runtime, and a secondary data storage 208, which may be non-volatile and stores machine readable instructions and data. The memory 206 and data storage 208 are examples of non-transitory computer readable mediums. The memory 206 and/or the secondary data storage may store data used by the system 102, such as an object repository including web objects, configuration data, test data, etc.

The computer system 200 may include an Input/Output (I/O) device 210, such as a keyboard, a mouse, a display, etc. A user interface (UI) 212 can be a communication device that provides textual and graphical user interfaces to a user of the system 102. The UI 212 may operate with I/O device 210 to accept from and provide data to a user. The computer system 200 may include a network interface 214 for connecting to a network. Other known electronic components may be added or substituted in the computer system. The processor 202 may be designated as a hardware processor. The processor 202 may execute various components of the system 102 described above and perform the methods described below.

Figure 3:
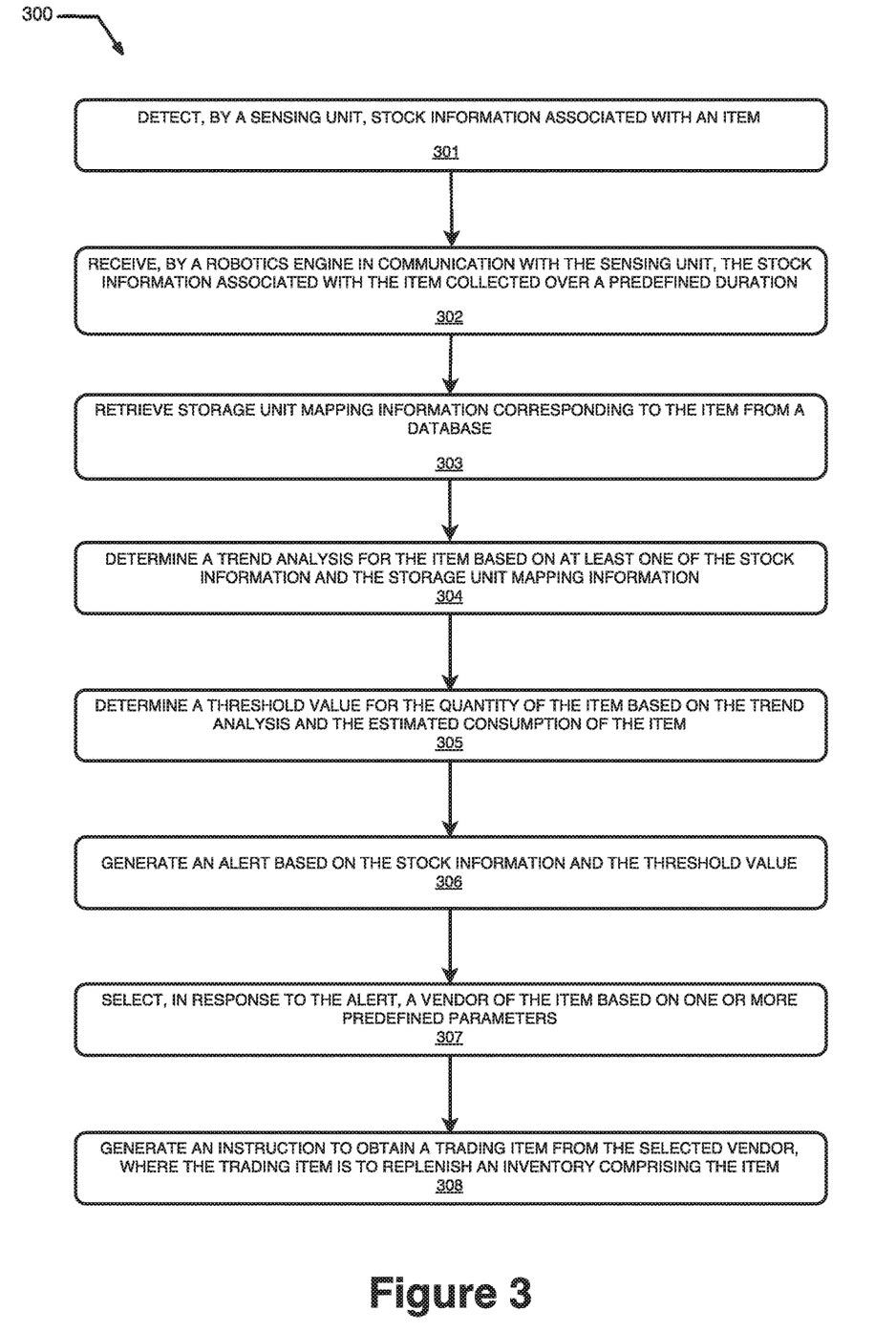
FIG. 3 illustrates a computer-implemented method depicting functionality of the system, according to an example of the present disclosure.

FIG. 3 illustrates a computer-implemented method 300 depicting functionality of the system 102, according to an example of the present disclosure. For the sake of brevity, construction and operational features of the system 102 which are explained in detail in the description of FIG. 1 and FIG. 2 are not explained in detail in the description of FIG. 3, FIG. 4, FIG. 5, and FIG. 6.

Referring to FIG. 3, at 301, the stock information associated with the item 104 is detected by the sensing unit 110. The stock information of the item 104 may be indicative of at least one of the height of the item 104, the width of the item 104, the length of the item 104, the weight of the item 104, and the quantity of the item.

At 302, the stock information associated with the item 104 collected over the predefined time duration is received. In one example embodiment, the AIA module 118 of the system 102 may receive the stock information associated with the item 104.

At 303, storage unit mapping information corresponding to the item 104 is retrieved from the database. The storage unit mapping information is indicative of the unique identification number associated with the storage unit 108 adapted to carry the item 104. In one example embodiment, the AIA module 118 of the system 102 may retrieve the storage unit mapping information.

At 304, the trend analysis for the item 104 is determined based on the stock information and the storage unit mapping information. The trend analysis is indicative of the variation in the quantity of the item 104 in the storage unit 108 over the predefined time duration. The trend analysis may be performed using a machine learning technique and a data mining technique. For example, the data mining technique may be associated with at least one of a location where the item 104 is stored, a quantity of the item 104 consumed over the predefined duration of time, and an environmental condition in which the item 104 is stored.

In an example embodiment, a machine learning technique comprising the Apriori algorithm along with data mining techniques may be used to identify one or more patterns over transactional data. The transactional data may include bin-material mapping data as discussed above and data regarding the consumption of items over a predefined period of time. The identified patterns are searched against the transactional data to derive trends and establish threshold limits for various items 104. For example, a pattern "Material-quantity consumed-month-year" may be formed based on the trend analysis. In one example embodiment, the AIA module 118 of the system 102 may perform the trend analysis.

At 305, the threshold value for the quantity of the item 104 is determined based on the trend analysis. In an example embodiment, the AIA module 118 may determine the threshold value for the quantity of the item 104.

At 306, the alert is generated based on the stock information and the threshold value. The alert may be indicative of the stock information being below the threshold value. In an example embodiment, the AIA module 118 generates the alert based on the stock information and the threshold value.

At 307, in response to the alert, the vendor of the item 104 is selected based on the one or more predefined parameters. The predefined parameters may include at least one of the quality of the replacement item 104 provided by the vendor, the cost of the replacement item 104 set by the vendor, the time of delivery associated with the replacement item 104 as claimed by the vendor, the defect rate of the procured item 104 purchased prior to the replacement item 104 received from the vendor, the item output, and historical records of the vendor. In an example embodiment, the AIA module 118 may select the vendor based on the predefined parameters.

At 308, the instruction to obtain the replacement item 104 from the selected vendor for replenishing the item 104 in the inventory is generated. Once the instruction is generated, the instruction may be sent to the administrator for approval. On receiving the approval, the instruction is transmitted to the vendor for obtaining the replacement item 104. In an example, the ERP module 120 generates the instruction to obtain the item 104 to be replenished.

Figure 4:
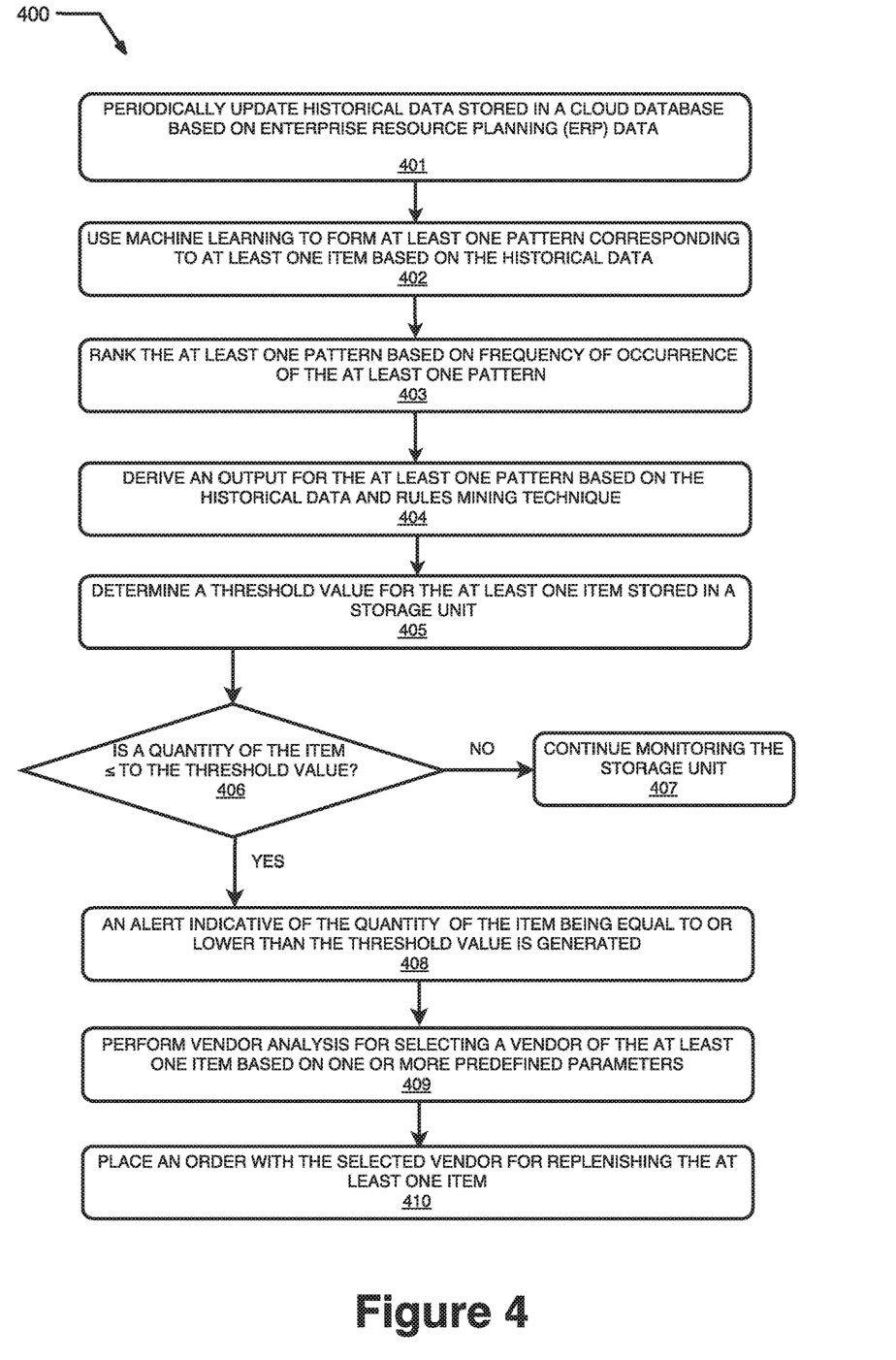
FIG. 4 illustrates a computer-implemented method depicting functionality of the system, according to another example of the present disclosure.

FIG. 4 illustrates a computer-implemented method 400 depicting functionality of the system 102, according to another example of the present disclosure. At 401, historical data stored in the cloud network 116 is updated periodically based on the ERP data. The historical data comprises the stock information associated with the item 104 received over the predefined duration of time. The ERP data includes the item master data, the storage unit master data, the mapping data, the vendor metrics data, and the instruction creation data. In an example, the ERP data is stored in the database, as described in the description of FIG. 1. In an example, the AIA module 118 may receive the ERP data from the ERP module 120 and may subsequently update the historical data.

At 402, machine learning is used to form at least one pattern corresponding to the item 104 based on the historical data. In an example, the AIA module 118 may implement the machine learning by using, for example, the Apriori algorithm. The pattern may be indicative of a consumption of the item 104 during various time periods, for example, during the peak season and the off season.

At 403, the pattern is ranked based on frequency of occurrence of the pattern. In an example embodiment, the AIA module 118 may rank the pattern based on the frequency of occurrence of the pattern.

At 404, an output for the pattern is derived from the historical data by using data mining techniques, and rules associated with an algorithm such as the Apriori algorithm on the historical data. In an example embodiment, the AIA module 118 may derive this output.

At 405, the threshold value for the item 104 stored in the storage unit 108 is determined. In an example embodiment, the threshold value is determined based on the pattern and estimated consumption of the item 104. In an example embodiment, the AIA module 118 may determine the threshold value.

At 406, a quantity of the item 104 is compared with the threshold value. In an example, the AIA module 118 may perform the comparison. When the quantity is greater than the threshold value, the method proceeds to 407. At 407, the monitoring of the storage unit 108 is continued by comparing the quantity with the threshold value. In an example embodiment, the AIA module 118 may monitor the storage unit 108. In another example embodiment, when the quantity is less than or equal to the threshold value, the method proceeds to 408.

At 408, the alert is generated which is indicative of the quantity of the item 104 being below the threshold value. In another example embodiment, a plurality of alerts may be generated based on a difference between the stock information and the threshold value. For example, an alert generated in case of the difference being small may be different from an alert generated in case of the difference being critical.

At 409, a vendor analysis is performed for selecting the vendor based on the one or more predefined parameters. In an example embodiment, the AIA module 118 may perform the vendor analysis based on the predefined parameters.

At 410, an order is placed with the selected vendor for replenishing the item 104. Once the vendor is selected, the instruction to obtain the item 104 from the vendor is generated. Subsequently, the instruction is sent to the administrator for approval. On receiving the approval, the instruction is transmitted to the vendor. In an example, the ERP module 120 forwards the instruction to the selected vendor.

Figure 5:
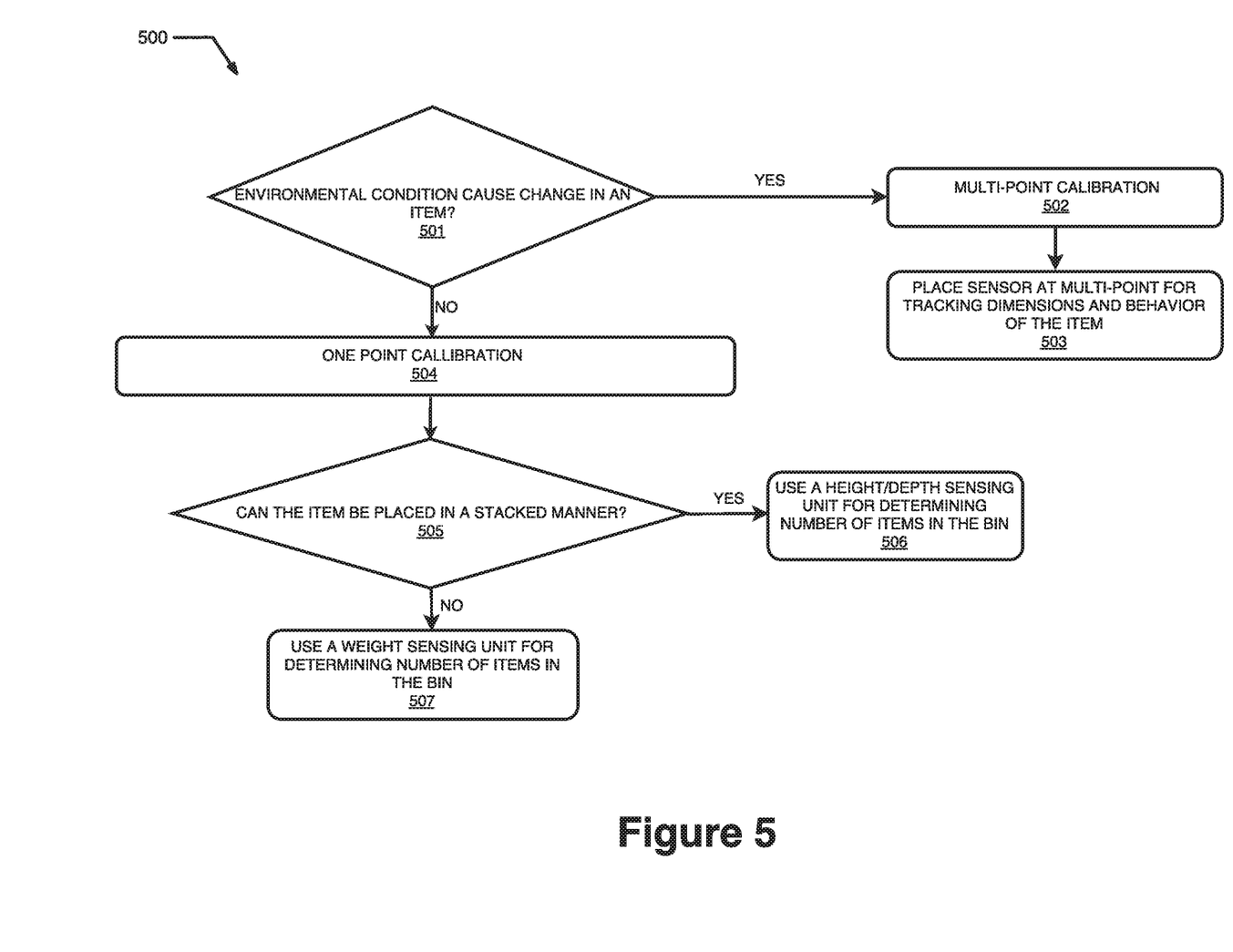
FIG. 5 illustrates a computer-implemented method depicting calibration of a sensing unit of the system, according to an example of the present disclosure.

FIG. 5 illustrates a computer-implemented method 500 depicting calibration of the sensing unit 110 of the system, according to an example of the present disclosure. At 501, it is ascertained whether the environmental factors cause a change in the item 104. If so, the method proceeds to 502. At 502, a multi-point calibration of the sensing units 110 is performed. In the multi-point calibration, at 503, the sensing units 110 are placed at multi-points on and around the item 104 for tracking dimensions and behavior of the item 104. On the other hand, if the environmental factors may not cause a change in the item 104, the method proceeds to 504.

At 504, a one-point calibration is performed to detect the stock information of the item 104. When a sensor output is already scaled to useful measurement units, a one-point calibration may be used to correct for offset errors in values detected by the sensing unit 110. In the present embodiment, since the dimensions and characteristics of the item 104 are not affected by the environmental factors, a single level detection of the dimensions of the item 104 is used by calibration the sensing unit 110 using the one-point calibration. For performing the one-point calibration, the method proceeds to 505, where it is ascertained whether the item 104 can be placed in the stacked manner or not. If the item 104 can be placed in the stacked manner, the method proceeds to 506. At 506, at least one of the height sensing unit and the depth sensing unit is used for determining the number of items 104 in the storage unit 108.

For example, if the item 104 is a laptop encased in a box, the sensing unit 110 may be the height sensing unit adapted to detect the stock information by detecting a total height of the stack. Based on the total height of the stack and a height of a single item 104, the sensing unit 110 may detect the stock information, such as the quantity of the item 104 positioned in the storage unit 108. For example, a height value of a single item 104 may be stored in a memory. The sensing unit 110 may output a value representing a total height for a stack of items 104 and the single item value may be retrieved from memory, and used to determine a quantity of items 104 making up the total height for the stack.

On the other hand, when the item 104 cannot be placed in the stacked manner, the method proceeds to 507. At 507, the weight sensing unit is used for determining the number of items 104 in the storage unit 108. For example, in case of the item 104 being small in size and having dimensions similar to other items 104 in the storage unit 106, such as screw-nuts, the sensing unit 110 may be the weight sensing unit adapted to detect the stock information of the item 104 by detecting a total weight of the items 104. Based on the total weight of the items 104 and the weight value of a single item 104, the sensing unit 110 may detect the stock information, such as the quantity of the item 104 positioned in the storage unit 108.

Figure 6:
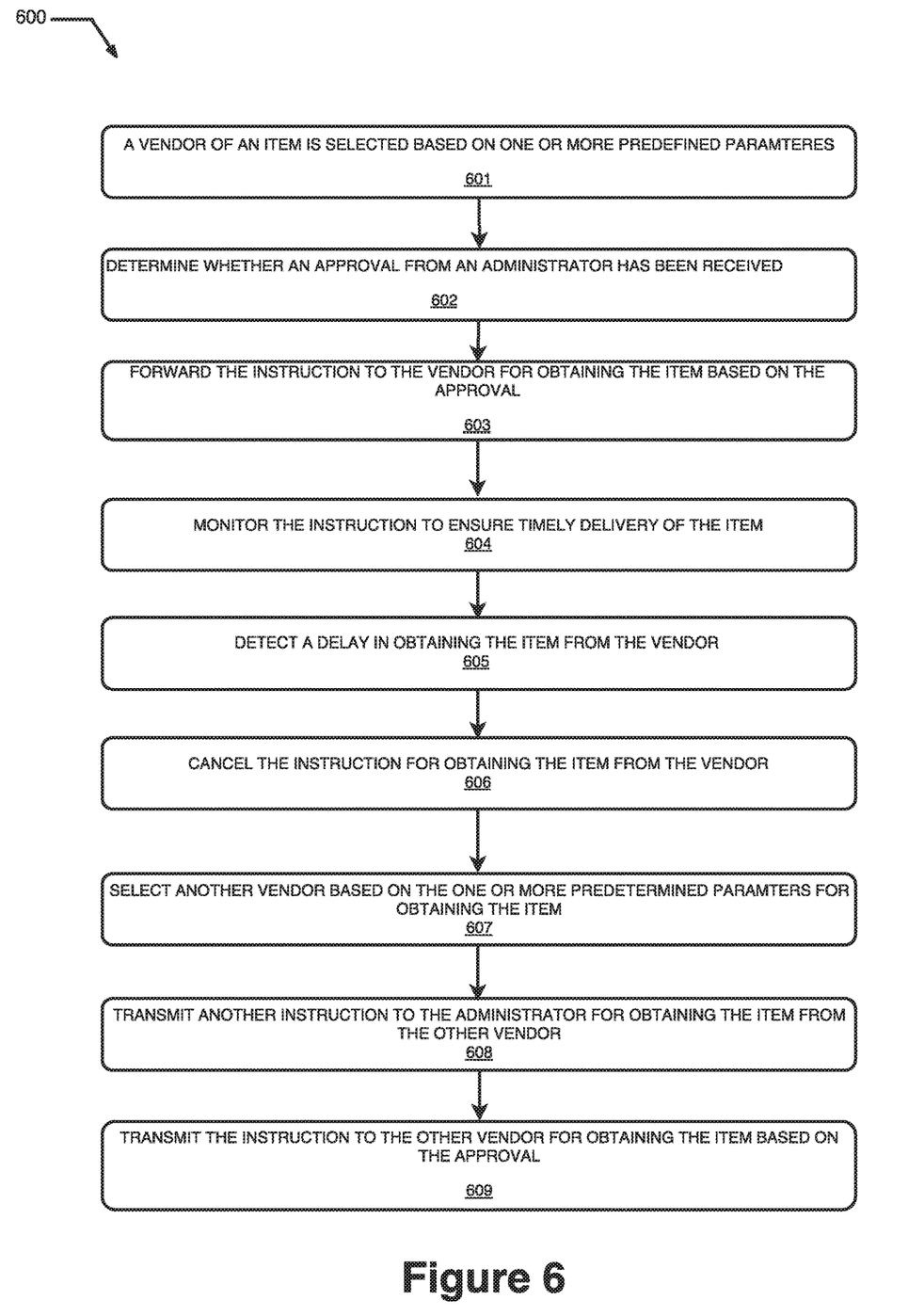
FIG. 6 illustrates a computer-implemented method depicting selection of a vendor by the system, according to one example of the present disclosure.

FIG. 6 illustrates a computer-implemented method 600 depicting selection of the vendor by the system 102, according to one example of the present disclosure. In one example embodiment, the AIA module 118 may select the vendor. The method 600 commences after generation of the alert indicative of the stock information being below or equal to the threshold value.

At 601, the vendor is selected, based on the predefined parameters. The predefined parameters would be the same as mentioned earlier in the description. Referring to the predefined parameters, in an example, the AIA module 118 may analyze the historical records of the vendors. A historical record of a vendor may include, for example, previous instructions for items 104 placed with the vendor, information related to quality of the item 104 received from the vendor, information related to product recall due to quality of the item 104 not being of an acceptable defined standard, as received from the vendor. Based on the historical records, the AIA module 118, in an example, may transmit information to the ERP module 120 for generating an instruction for the vendor.

At 602, it is determined whether an approval from the administrator is received for transmitting the instruction to the vendor for obtaining the items 104. If the approval has been received, the method 600 branches to 603. At 603, the instruction is forwarded to the vendor for obtaining the items 104. In one example embodiment, the ERP module 120 forwards the instruction to the vendor.

At 604, the instruction is monitored in order to ensure that the items 104 are received from the vendor in a timely manner. As a result of the monitoring, at 605, a delay is detected in obtaining the items from the vendor. The delay may be detected based on an estimated time of delivery. In one example embodiment, the ERP module 120 may detect the delay.

Following the detection of the delay, at 606, the instruction for obtaining the items from the vendor is canceled. In one example embodiment, the AIA module 118 may cancel the instruction. In an example, after cancelling the instruction for obtaining the items from the vendor, the AIA module 118 may recall the instruction for obtaining the items from the vendor.

At 607, another vendor is selected for obtaining the items 104, based on the predefined parameters. The predefined parameters may include, but are not limited to, the quality of the item 104 delivered by the other vendor, the cost of the item 104 set by the other vendor, the time of delivery claimed by the other vendor, a defect rate of the procured item 104 prior to the replacement item 104 from the other vendor, the item output, and historical records of the other vendor. In an example embodiment, the AIA module 118 may select the other vendor.

Coming back to 602, in an example embodiment, the administrator may not approve transmission of the instruction to the vendor. In such a case, the method 600 branches directly to 607.

At 608, another instruction for obtaining the items 104 from the other vendor is transmitted to the administrator for approval. In an example embodiment, the ERP module 120 may transmit the other instruction.

At 609, based on the approval from the administrator, the instruction for obtaining the item is transmitted to the other vendor.

In an example where an item type to be stored and whose stock is to be managed is a laptop encased in a box, the sensing unit 110 may be the height sensing unit. The sensing unit 110 may detect the stock information of the laptops as explained earlier. The AIA module 118 of the robotics engine 112 may map the unique identification numbers of the laptops with the unique identification numbers of the storage units 108, based on the respect positioning of the laptops on the storage units 108. Based on the mapping and the stock information of the laptops detected by the sensing unit 110, the AIA module 118 may perform the trend analysis for the laptops. The AIA module 118 may perform the trend analysis using, for example, the Apriori algorithm and its associated data mining and machine learning techniques. The trend analysis may reflect a stock level of the laptops in the warehouse 106 over the predefined duration of time. For example, by referring to the trend analysis, demand and consumption of the laptops during the predefined duration of time can be evaluated.

Furthermore, based on the trend analysis, the AIA module 118 may estimate consumption or sale of the laptops in the coming months of the year or beyond the year. Therefore, demand of the laptops in the future can be estimated and accordingly the supply of the laptops can be controlled to meet the expected demand. In continuation with the above-mentioned analysis, the AIA module 118 may determine a threshold value for the quantity of the laptops to be maintained in order to ensure the requisite availability of the laptops in the warehouse 106.

The AIA module 118 may compare the threshold value with the quantity of the laptops available in the warehouse 106 at a specific point in time. When the quantity of the laptops drops below the threshold value, the AIA module 118 may generate an alert indicating a demand of the laptops in the warehouse 106. Further, the AIA module 118 may select a vendor of the laptops by using data mining techniques and rules associated with, the Apriori algorithm, based on the predefined parameters as mentioned before. Once the alert is generated and the vendor is selected by the AIA module 118, the ERP module 120 of the robotics engine 112 may generate an instruction to obtain the laptops required to meet the threshold value in the warehouse 106 from the selected vendor.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
   at least one sensing unit to detect at least one of a height of an item, a length of the item, a width of the item, and a weight of the item to determine a quantity of the item positioned on a storage unit in real time, determining the quantity of the item being based on:
      ascertaining whether environmental factors cause a change in the item;
      when the environmental factors do not cause the change in the item, obtaining data pertaining to one or more of the weight and a dimension of the item from the at least one sensing unit to determine the quantity of the item; and
      when the environmental factors cause the change in the item, obtaining data pertaining to dimensions of the item and a characteristic behavior of the item from multiple sensing units associated with the storage unit positioning the item to determine the quantity of the item; and
   a robotics engine in communication with the at least one sensing unit, the robotics engine comprising a processor in communication with a memory, the processor to execute machine readable instructions to:
      receive data pertaining to the quantity of the item, the data pertaining to the quantity of the item collected over a predefined time duration;
      retrieve storage unit mapping information corresponding to the item from a database, wherein the storage unit mapping information is indicative of a unique identification number associated with a storage unit adapted to carry the item;
      determine a trend analysis for the item based on the quantity of the item and the storage unit mapping information, wherein the trend analysis is indicative of a variation in the quantity of the item in the storage unit over the predefined time duration;
      determine a threshold value for the quantity of the item, based on the trend analysis;
      generate an alert based on the quantity of the item and the threshold value, wherein the alert is indicative of the quantity of the item being below the threshold value;
      select, in response to the alert, a vendor of the item based on one or more predefined parameters, wherein the one or more predefined parameters comprise at least one of:
         a quality of a replacement item provided by the vendor, wherein the replacement item is to replenish an inventory comprising the item;
         a cost of the replacement item set by the vendor; a time of delivery associated with the replacement item; and a defect rate of a procured item purchased prior to the replacement item from the vendor, or historical records of the vendor;

generate an instruction to obtain the replacement item from the selected vendor for replenishing the item in the inventory; and place an order of the replacement item with the vendor to replenish at least a portion of the inventory.

2. The system of claim 1, wherein the robotics engine is to:

detect a delay in obtaining the replacement item from the vendor, based on an estimated time of delivery of the replacement item;

cancel the instruction for obtaining the replacement item from the vendor, based on the detection;

select another vendor for obtaining the replacement item, based on the one or more predefined parameters, wherein the one or more predefined parameters comprise at least one of:

a quality of the replacement item provided by the other vendor;

a cost of the replacement item set by the other vendor;

a time of delivery associated with the replacement item; and a defect rate of the procured item purchased prior to the replacement item from the other vendor, or historical records of the other vendor; and generate another instruction to obtain the replacement item from the selected vendor for replenishing the item in the inventory.

3. The system of claim 2, wherein the robotics engine is to, identify whether the replacement item is obtained from the vendor, based on the quantity of the item.

4. The system of claim 1, wherein the robotics engine is to update the threshold value of the item once the replacement item is obtained from the vendor.

5. The system of claim 1, wherein the at least one sensing unit includes at least one of a dimension sensing unit, a depth sensing unit, a weight sensing unit, and a beacon.

6. The system of claim 5, wherein the at least one sensing unit comprises at least one of the dimension sensing unit and the depth sensing unit, when a plurality of items are stacked over one another.

7. The system of claim 5, wherein the at least one sensing unit comprises the weight sensing unit, when a plurality of items are not stacked over one another.

8. The system of claim 1, wherein the at least one sensing unit is calibrated based on dimensions, arrangement, and the characteristic behavior of the item due to environmental factors, the characteristic behavior including one of a size, a shape, and chemical properties of the item.

9. The system of claim 8, wherein a one-point calibration is performed for the at least one sensing unit when the characteristic behavior of the item does not vary based on the environmental factors, and a multi-point calibration is performed for at least one sensing unit when the behavior of the item varies based on the environmental factors.

10. The system of claim 1, wherein the robotics engine is to:

allocate the unique identification number to the storage unit adapted to carry the item;

obtain environment information associated with the storage unit, wherein the environment information is indicative of at least one of a temperature value and an air pressure value of an area surrounding the storage unit;

map the item to the unique identification number of the storage unit based on the environment information associated with the storage unit; and store the mapping as the storage unit mapping information in the database.

11. A computer-implemented method executed by at least one processor, the method comprising:

detecting, by at least one sensing unit at least one of a height of an item, a length of the item, a width of the item, and a weight of the item to determine a quantity of the item in real-time, determining the quantity comprising:

ascertaining whether environmental factors cause a change in the item;

when the environmental factors do not cause the change in the item, obtaining data pertaining to one or more of the weight and a dimension of the item from the at least one sensing unit to determine the quantity of the item; and when the environmental factors cause the change in the item, obtaining data pertaining to dimensions of the item and a characteristic behavior of the item from multiple sensing units associated with the storage unit positioning the item to determine the quantity of the item;

receiving, by a robotics engine in communication with the at least one sensing unit, stock information associated with the item collected over a predefined time duration, the stock information comprising at least one of the height of the item, the length of the item, the width of the item, the weight of the item, and the quantity of the item;

retrieving storage unit mapping information corresponding to the item from a database, wherein the storage unit mapping information is indicative of a unique identification number associated with a storage unit adapted to carry the item;

determining a trend analysis for the item based on the stock information quantity of the item and the storage unit mapping information, wherein the trend analysis is indicative of a variation in the quantity of the item in the storage unit over the predefined time duration;

determining a threshold value for the quantity of the item, based on the trend analysis;

generating an alert based on the stock information quantity of the item and the threshold value, wherein the alert is indicative of the quantity of the item being below the threshold value;

selecting, in response to the alert, a vendor of the item based on one or more predefined parameters, wherein the one or more predefined parameters comprise at least one of:

a quality of a replacement item provided by the vendor, wherein the replacement item is to replenish an inventory comprising the item;

a cost of the replacement item set by the vendor;

a time of delivery associated with the replacement item; and a defect rate of a procured item purchased prior to the replacement item from the vendor, or historical records of the vendor;

generating an instruction to obtain the replacement item from the selected vendor for replenishing the item in the inventory; and placing an order for the replacement item with the vendor to replenish at least a portion of the inventory.

12. The computer-implemented method of claim 11 further comprising:
 detecting a delay in obtaining the replacement item from the vendor, based on an estimated time of delivery of the replacement item;
 canceling the instruction for obtaining the replacement item from the vendor, based on the detection;
 selecting another vendor for obtaining the replacement item, based on the one or more predefined parameters, wherein the one or more predefined parameters comprise at least one of the quality of the replacement item provided by the other vendor, a cost of the replacement item set by the other vendor, a time of delivery associated with the replacement item, and a defect rate of a procured item purchased prior to the replacement item from the other vendor, or historical records of the other vendor; and
 generating another instruction to obtain the replacement item, based on the selection of the other vendor.

13. The computer-implemented method of claim 12 further comprising:
 ascertaining whether the replacement item is obtained from the vendor, based on the stock information of the item received from the at least one sensing unit.

14. The computer-implemented method of claim 12 further comprising updating the threshold value of the item once the replacement item is obtained from the vendor.

15. The system of claim 1, wherein the at least one sensing unit to determine the quantity of the item is to:
 ascertain whether the item is stackable;
 when the item is stackable, obtain data from at least one of a dimension sensing unit and a depth sensing unit; and
 when the items are not stackable, obtain the data from a weight sensing unit.

* * * * *